United States Patent
Engström

(10) Patent No.: US 7,743,650 B2
(45) Date of Patent: Jun. 29, 2010

(54) SYSTEM AND METHOD FOR DYNAMOMETER TESTING OF MOTOR VEHICLES, INCLUDING A COOLING DEVICE

(76) Inventor: Nils G Engström, Rönningevagen 3, SE-144 61, Rönninge (SE)

(*) Notice: Subject to any disclaimer, the term of this patent is extended or adjusted under 35 U.S.C. 154(b) by 201 days.

(21) Appl. No.: 11/988,381

(22) PCT Filed: May 31, 2006

(86) PCT No.: PCT/SE2006/000639

§ 371 (c)(1), (2), (4) Date: Jan. 7, 2008

(87) PCT Pub. No.: WO2007/008133

PCT Pub. Date: Jan. 18, 2007

(65) Prior Publication Data

US 2009/0107254 A1   Apr. 30, 2009

(30) Foreign Application Priority Data

Jul. 12, 2005  (SE) .................. 0501654-8

(51) Int. Cl.
*G01M 17/007* (2006.01)

(52) U.S. Cl. .................. 73/114.68; 73/116.05

(58) Field of Classification Search .............. 73/114.13, 73/114.14, 114.15, 114.68, 116.01, 116.02, 73/116.05, 116.06, 116.07, 116.08, 116.09, 73/116.11, 118.01, 118.02
See application file for complete search history.

(56) References Cited

U.S. PATENT DOCUMENTS

| | | | | |
|---|---|---|---|---|
| 4,669,318 A | * | 6/1987 | Angstrom | 73/862.09 |
| 5,136,878 A | * | 8/1992 | Wolcott | 73/116.06 |
| 7,367,229 B2 | * | 5/2008 | Engstrom | 73/168 |
| 2006/0137443 A1 | * | 6/2006 | Engstrom | 73/168 |
| 2008/0173101 A1 | * | 7/2008 | Sowle | 73/862.09 |
| 2009/0126510 A1 | * | 5/2009 | Engstrom | 73/862.14 |

* cited by examiner

*Primary Examiner*—Eric S McCall
(74) *Attorney, Agent, or Firm*—Jacobson Holman PLLC

(57) ABSTRACT

The present invention relates to a system for dynamometer testing of motor vehicles. The system includes a cooling device for cooling a braking device and/or a power-generating arrangement, such as the engine of a car. The system is arranged to, using the braking device, absorb power applied thereto by the power-generating arrangement. The cooling device includes a fan arrangement for producing an air stream, the air stream being intended to be directed towards the braking device and/or the power-generating arrangement and/or a heat exchanger for providing a cooling effect. The fan arrangement includes two substantially axially aligned fans, and the cooling device is arranged to rotate the fans in opposite directions relative to each other. The present invention also relates to a method.

20 Claims, 3 Drawing Sheets

SYSTEM AND METHOD FOR DYNAMOMETER TESTING OF MOTOR VEHICLES, INCLUDING A COOLING DEVICE

This is a national stage of International Application No. PCT/SE2006/000639 filed on May 31, 2006 and published in English.

FIELD OF THE INVENTION

The present invention relates to a system for dynamometer testing of motor vehicles, said system including a cooling device intended for cooling a braking device and/or power generating means, in particular, a system for dynamometer testing of motor vehicles, including a cooling device for a braking device and/or a power-generating means, and having power-absorbing means for absorbing a power applied thereto by power-generating means, the cooling device including a fan arrangement for producing an air stream, said air stream being intended to provide a cooling effect.

The invention further relates to a method for cooling a braking device and/or a power-generating means in a system for dynamometer testing of motor vehicles, in particular, a method for cooling a braking device and/or a power-generating means in a system for dynamometer testing of motor vehicles, wherein power-absorbing means is used to absorb a power applied thereto by power-generating means, wherein a cooling device includes a fan arrangement for producing an air stream for providing a cooling effect.

BACKGROUND OF THE INVENTION

This invention relates in particular to devices for dynamometer testing of motor vehicles, that is, devices which are adapted to be connected to a driven vehicle output shaft and which include means for measuring one or more quantities significant to the performance of the engine and the transmission, such as the torque that the driven shaft applies to a power-absorbing device forming part of the test device.

One such device is disclosed in EP 0 210 979, which discloses a device including power-absorbing means in the form of a hydraulic pump assembly which has an input shaft adapted to be in engagement with a driven vehicle shaft using a rigid coupling. The pump assembly consists of two pumps, which are drivingly interconnected and thereby both driven by the shaft. An adjustable control valve is controlled such that the valve allows the passage of a liquid flow, the volumetric rate of which being related to the desired rotational speed of the rotor, i.e. of the driven vehicle shaft. By controlling the working pressure of the pumps, a desired torque can be applied to the drive shaft of the vehicle, and, thereby, the performance of the engine can be tested.

A problem with this device, however, is that as vehicle engines increasingly tend to generate higher and higher powers, and higher and higher torques, the heat generated by the power-absorbing means when testing these engines, e.g., as a temperature rise of the hydraulic fluid when passing through the control valve, becomes more difficult to cool.

SUMMARY OF THE INVENTION AND MOST IMPORTANT FEATURES

It is an object of the present invention to provide a system for dynamometer testing of motor vehicles including a cooling device that solves the above mentioned problem. In particular, it is an object of the present invention to provide a system that allows more efficient cooling of generated heat in power-absorbing means and/or power-generating means.

This object is achieved by a system where its fan arrangement includes two fans, which are substantially axially aligned, and that the cooling device including means for rotating the fans in opposite directions relative to each other.

According to the invention, the system for dynamometer testing of a motor vehicle includes a cooling device, which includes a fan arrangement for producing an air stream, said air stream being intended to be directed towards the braking device and/or the power-generating means and/or a heat exchanger for providing a cooling effect. The fan arrangement includes two fans, which are substantially axially aligned, wherein the cooling device includes means for rotating the fans in opposite directions relative to each other.

The use of contra-rotating fans, which are axially aligned or at least substantially axially aligned, has the advantage that the resulting air stream, as opposed to the rotating, turbulent air stream of a single fan system, constitutes a relatively non-turbulent, non-rotating parallel air stream.

This, in turn, has a plurality of advantages. The non-turbulent parallel air stream can be directed towards a desired point more precisely, and, because of the parallel and non-turbulent air stream, the cooling effect thereof can be more efficiently used, i.e. a larger portion of the produced air stream reaches the power absorber and/or power-generating means and/or heat exchanger.

Further, the resulting air pressure of the two-stage fan arrangement is 2-3 times the static pressure of a single fan, which, especially in view of the above, has a considerably larger cooling effect as compared to the prior art.

Even further, as vehicle engines produce more and more power, the cooling demands of these engines increase as well. The present invention may advantageously be used to direct the air stream also towards the engine radiator. In one embodiment, the air stream can be directed so as to hit both the engine of the car and the power-absorbing means. In an alternative embodiment, the cooling device may, as will be disclosed below, include two (or more) fan arrangements, so as to allow separate air streams to be directed towards the engine of the car and the power-absorbing means, respectively.

Also, due to the higher air velocities obtainable with the present invention, the air stream is suitable for simulating vehicle speed related wind resistance since back-pressure, e.g. through the engine radiator, can be overcome by the air pressure generated by the present invention.

The power-absorbing means may consist of a hydraulic pump or of a hydraulic pump assembly including at least two hydraulic pumps, and each fan may be driven by a hydraulic motor. This has the advantage that high powers may be absorbed, and that relatively high output air powers may be accomplished by, relatively small components.

In one embodiment a controlled portion of the pump or pump assembly output flow is diverted to the fan motors. This has the advantage that the same hydraulic system may be used both for power absorption and air flow generation.

A control valve may control the (pump) flow and/or pressure to the fan motors. This has the advantage that the cooling effect can be regulated, i.e. when no or small amounts of power are generated, e.g., by an idling car engine, the flow to the fan motors may be completely shut off, while a racing engine on top gear, the control valve may be fully open. As an alternative to the control valve, a fixed or variable displacement hydraulic pump may be used to divert a controlled portion of the pump or pump assembly output flow to the fan motors. As yet another alternative, fixed or variable displacement fan motors themselves may be arranged to divert a controlled portion of the pump or pump assembly output flow.

The flow and/or pressure to the each fan motor may be individually controllable. This has the advantage that one fan may be driven at a maximum, while the other is used to adjust the flow.

The invention further relates to a method for cooling a braking device and/or a power-generating means in a system for dynamometer testing of motor vehicles.

DETAILED DESCRIPTION OF EXEMPLARY EMBODIMENTS

Figure 1:
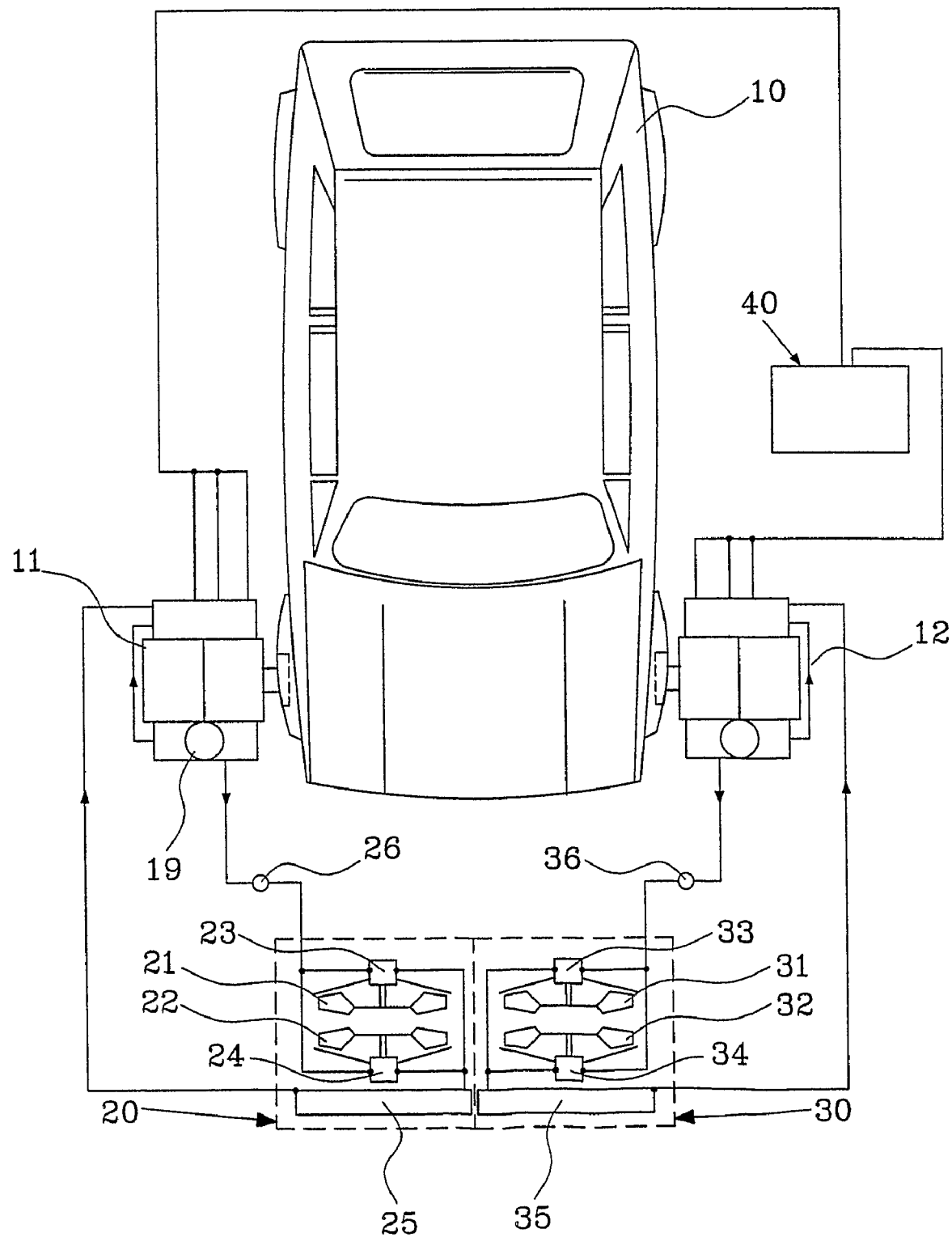
FIG. 1 shows a system in which the present invention advantageously may be used.

FIG. 1 shows a dynamometer testing system in which the present invention advantageously may be utilised. The system is connected to a vehicle 10, and comprises a pair of test units 11, 12. Each test unit 11, 12 is connected to a cooling device 20, 30. Each cooling device 20, 30 includes cooling fans 21, 22 (31, 32) which are hydraulically driven by hydraulic motors 23, 24 (33, 34). The two test units 11, 12 and the respective associated cooling devices 20, 30 are connected to a common measuring and control system 40.

Figure 2:
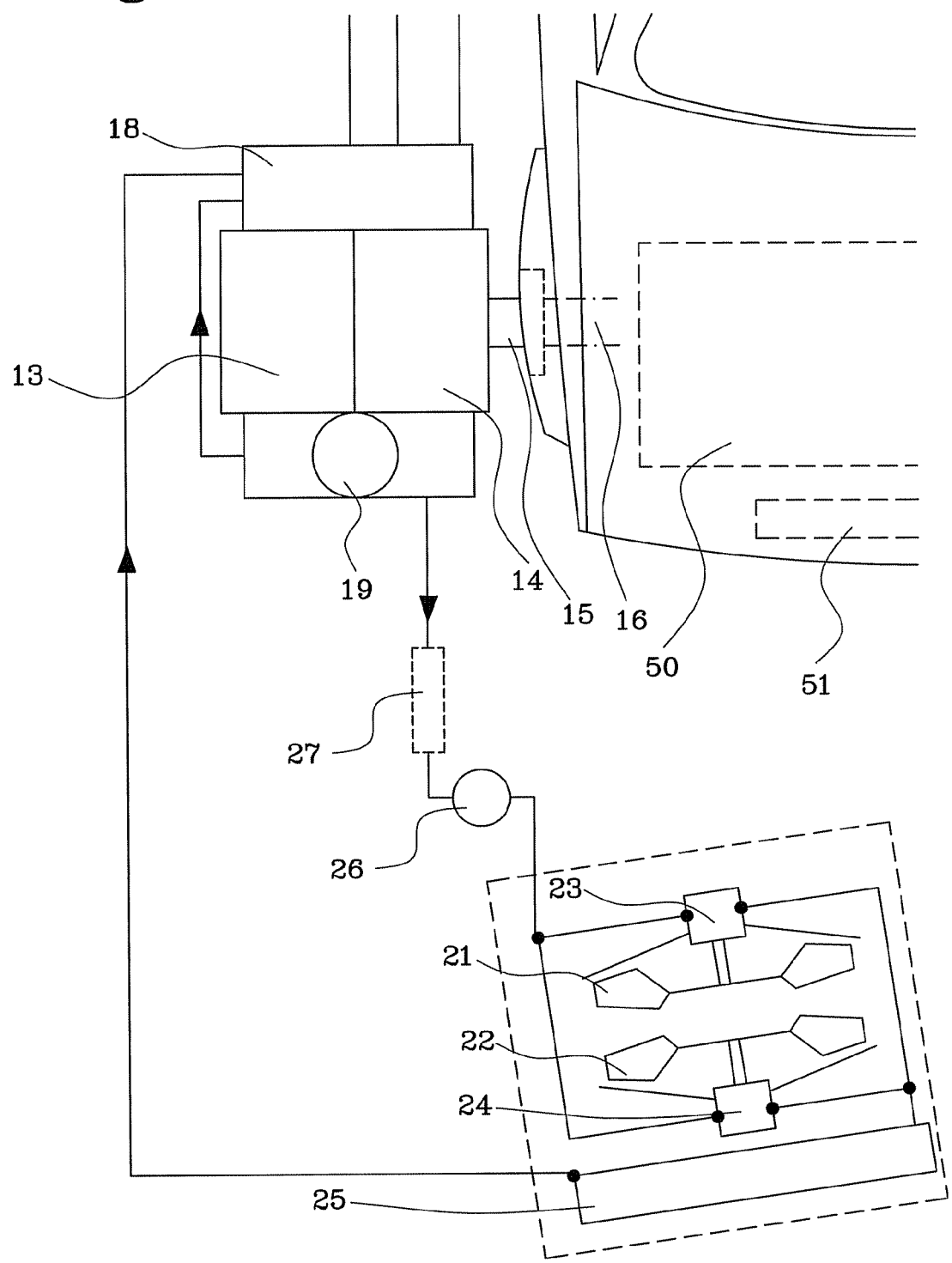
FIG. 2 shows part of the system disclosed in FIG. 1.

The test units 11, 12 are similar, and so is the cooling devices 20, 30, and as can be seen more in detail in FIG. 2, which shows the test unit 11 and the cooling device 20, each test unit 11, 12 comprises a dynamometer in the form of a power-absorbing hydrostatic pump assembly, consisting of two commonly driven hydraulic pumps 13, 14 and means for measuring the torque applied to the pump input shaft 15, which is arranged to be rigidly connected to a drive shaft 16 of the vehicle.

The pumps 13, 14 are connected to a hydraulic oil tank 18, and in use, a control valve 19 is used to control hydraulic pump flow and pressure. The output flow from the pumps is restricted using the control valve 19, so that a pressure is built up. This pressure tries to turn the pumps around their own axle. As is explained more in detail in EP 0 210 979, this turning motion is restricted by a load cell equipped with a strain gauge (not shown), and the signal from the strain gauge is supplied to the common measuring and control system 40. By calibrating the signal from the strain gauge against a known torque the signal will be proportional to the torque. The control valve 19 preferably constitutes an ultra fast control valve, such as the one described in the international patent application WO 2004/111739 A1, by the use of which both small and great liquid flows and pressure can be accurately adjusted. In this way, the vehicle 10 can be tested during rapid accelerations, and, further, wheel torque throughout the vehicle motor speed range can be easily measured.

When the hydraulic oil has passed the pumps 13, 14, it is passed back to the oil tank 18 for subsequent use. As can be seen in FIG. 2, a portion of the liquid flow, however, is diverted to the hydraulic motors 23, 24 driving the fans 21, 22 of the cooling device 20. In order to control the flow and/or pressure to the fan motors 23, 24, a second control valve 26 (36) is provided in the hydraulic circuit, between the high-pressure side of the pumps 13, 14 and the fan motors 23, 24.

Using this second control valve 26, the air stream produced by the fans 21, 22 can be independently controlled. For example, when the vehicle engine 50 is idling, and, accordingly, the generated power constitutes only a fraction of the maximum power of the engine 50, the flow to the fan motors 23, 24 may be completely shut off, i.e. the control valve 26 is closed, or reduced to a low level, since the required cooling effect in this case is low, both in regard of the vehicle engine 50 and in regard of the hydraulic pump assembly.

On the other hand, when the engine 50 is racing, in particular on top gear, and the required cooling effect is at a maximum both for the vehicle engine 50 and the pump assembly, the control valve 26 may be fully open, the air stream produced by the fans 21, 22 thus being at a maximum. The use of the control valve 26 further has the advantage that the risk of overspeeding the fan motors is reduced, since the control valve may act as a safety valve for the fan motors. In an alternative embodiment, in particular for use with demanding tests of high-performance engines, the control valve 26 may be omitted, i.e., there will always be a flow to the fan motors. The control valve 26 may advantageously be of the type described in WO 2004/111739 A1.

The size of the fan motors 23, 24, and thus the power produced by each fan motor 23, 24, may be determined based on the braking power of the test device. As an example, the power produced by each fan motor may, e.g., be 120 kW when the test device is capable of braking powers up to, e.g., 1000 kW.

As is shown in FIG. 2, the alignment of the fans 21, 22 may be such that part of the air stream hits the pump assembly, and part of the air stream hits the vehicle engine 50 (vehicle radiator 51). Alternatively, the air stream may be directed towards either of the two, depending on where the cooling effect is needed.

The two fans are arranged to rotate in opposite directions relative to each other. As stated above, the use of contra-rotating fans, which are axially aligned or at least substantially axially aligned, results in a relatively non-turbulent, non-rotating parallel air stream. In other words, when the air stream of the fan assembly in FIG. 2 is directed towards the pump assembly and/or vehicle engine radiator 51, a larger portion of the produced air stream reaches its desired target and, thereby, the cooling effect thereof can be more efficiently used.

Further, as also is stated above, the resulting air pressure of the two-stage contra-rotating fan arrangement is 2-3 times the static pressure of a single fan, which enables that back-pressure through the radiator 51 can be overcome, and thereby a sufficient cooling effect to the vehicle engine can be provided even when the engine is under a very heavy load. For example, race car engines may develop up to 1100 kW or more, which results in great demands on cooling devices. The achievable higher pressure may also be used to simulate high-speed driving, i.e. the air stream pressure directed towards the vehicle may be controlled by the fan motors to correspond, or substantially correspond, to the wind resistance that the vehicle would be subjected to in real life driving at the simulated speed. Preferably, the air stream pressure is controlled by the measuring and control system 40 by controlling the second control valve 26.

As can be seen in the figures, when the diverted portion of the hydraulic pump oil flow has passed the fan motors, this diverted portion is passed through a heat exchanger 25 (35) before it is passed on to the oil tank 18. As is shown in the figure, the heat exchanger 25 may preferably be positioned immediately behind the fan arrangement 20 such that the air drawn by the fans 21, 22 will pass the heat exchanger 25 and cool the oil. In an alternative embodiment, the heat exchanger 25 may be located in front of, or partly in front of the fan arrangement, so that the air stream provides the cooling effect. In the above embodiment, the air sucked through the heat exchanger 25 by the fans, and thus the air blown by the fans towards the pump assembly, may become quite warm due to the heat of the diverted oil. In order to pre-cool the diverted portion of the hydraulic pump oil flow, it may be passed through a second heat exchanger 27, schematically indicated in FIG. 2 by dashed lines, e.g. a water/oil cooler, in which water is used to cool the oil flow, which in turn has as result that the oil passing the heat exchanger 25, and thereby the air in the air stream, will have a lower temperature. The second heat exchanger may equally well be located between the fan motors and the heat exchanger 25.

Figure 3:
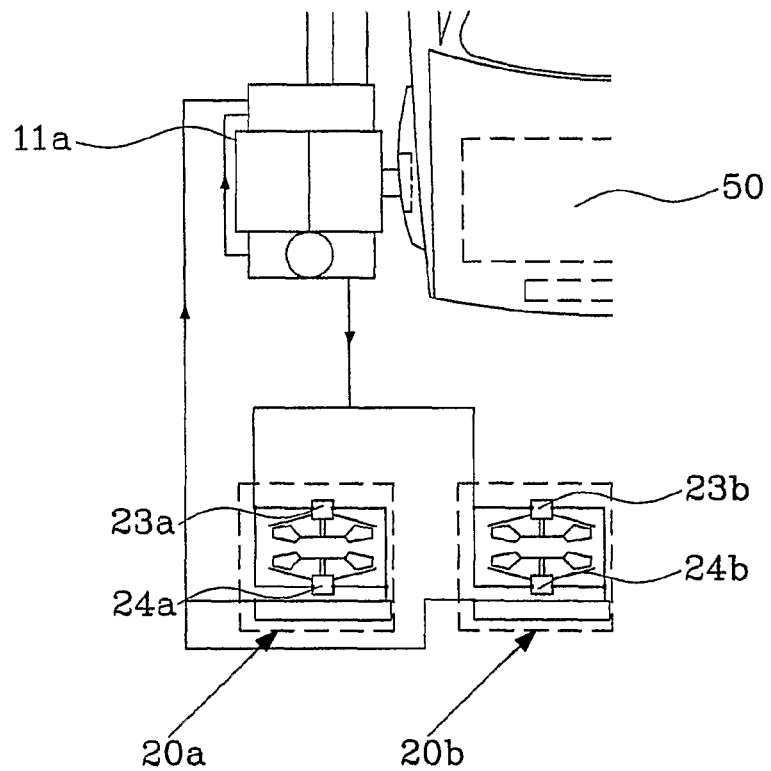
FIG. 3 shows an alternative exemplary embodiment of a cooling device according to the present invention.

In FIG. 3 is shown an alternative embodiment, in which each cooling device is provided with two fan arrangements 20a, 20b. This embodiment allows separate air streams to be directed towards the engine 50 of the car and the test device 11a, respectively, at all times. This is particularly advantageous when high-performance engines are subject to heavy-load testing for a considerable time, and both the vehicle engine and test device need a large cooling effect. In this example, the fan motors 23a-b, 24a-b may be smaller.

Figure 4:
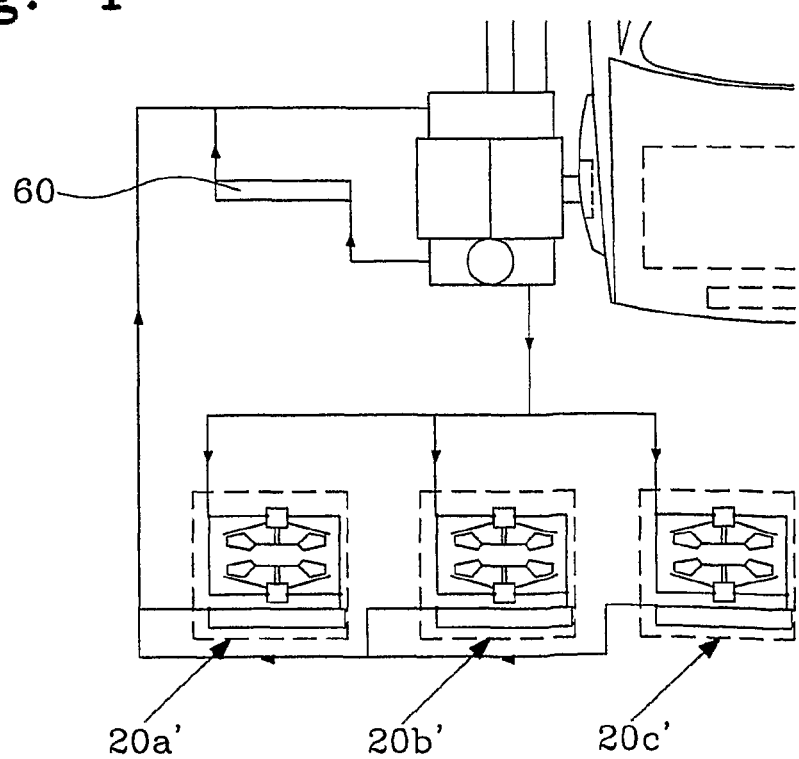
FIG. 4 shows another exemplary embodiment of the present invention.

Instead of two fan arrangements, even more may be used to allow air streams to be directed at desired points, see e.g., fan arrangements 20a', 20b', 20c' in FIG. 4. The fan arrangements may be positioned at different heights so as to best provide a desired cooling effect at a desired location. For example, if the diverted flow heat exchanger is located in front of the fan arrangements, the air stream of one of the fan arrangements may be directed towards the heat exchanger.

Alternatively, when positioning the fan arrangements, the fan arrangements from both test devices may be considered, for example, fan arrangements may be positioned on top of each other, with one fan arrangement from each drive shaft.

In yet another embodiment, the car may include a four-wheel drive, and, consequently, be provided with four test units during testing. In this case, the fan arrangements from all four test units may be considered as a whole when positioning them, e.g., more cooling effect may be concentrated to the front of the vehicle than to the rear.

Further, as is shown in FIG. 4, a second heat exchanger 60 may be arranged in the return path from the high-pressure side of the hydraulic pumps to the tank. This allows an even more efficient cooling, since, as is shown in the figure, one fan arrangement 20a' may be directed directly towards this second heat exchanger 60.

Instead of using a control valve for controlling the flow/pressure to the fan motors, a fixed or variable displacement hydraulic pump may be used to divert a controlled portion of the pump or pump assembly output flow to the fan motors. As yet another alternative, the fan motors themselves may be of fixed or variable displacement type and arranged to divert a controlled portion of the pump assembly output flow.

Further, in the above description the fan motors have been shown as connected in parallel. These may, of course, alternatively be connected in series. Even further, instead of having one control valve controlling all fan motors of one test device, each fan motor may be separately controlled by a separate control valve. In this way, the control system may control the fans such that one fan of each pair is driven at its maximum, while the other is used to adjust the air stream.

Also, the control valve(s) for controlling the fan motors has been shown as being located upstream of the fan motors. This control valve(s) may, of course, also be located downstream of the fan motors.

In the above description the fan arrangements have been powered by a diverted portion of the braking apparatus hydraulic pump flow. As is apparent to a person skilled in the art, however, the fan arrangement may equally well be powered by a separate hydraulic circuit, however with the disadvantage of added appliances.

Further, the cooling device has been described in connection with a dynamometer testing system. As is apparent to a person skilled in the art, however, the cooling device may be used in other applications as well, in which an easily controlled cooling effect is required. Further, in the above description the air stream(s) has been directed towards the breaking apparatus and/or the vehicle and/or a heat exchanger. In an alternative embodiment, the air stream may be directed in an arbitrary direction, since the fan arrangement according to the invention in itself is very efficient in cooling the diverted portion of the hydraulic pump flow.

The invention claimed is:

1. A system for dynamometer testing of motor vehicles, including a cooling device for a braking device and/or a power-generating means, and having power-absorbing means for absorbing a power applied thereto by power-generating means, the cooling device including a fan arrangement for producing an air stream, said air stream being intended to provide a cooling effect, characterised in that said fan arrangement includes two fans, which are substantially axially aligned, and that the cooling device including means for rotating the fans in opposite directions relative to each other.

2. The system according to claim 1, characterised in that said air stream is intended to be directed towards the braking device and/or the power-generating means and/or a heat exchanger.

3. The system according to claim 1, characterised in that each fan is driven by a hydraulic motor or motors, directly or indirectly by means of a transmission.

4. The system according to claim 1, wherein said power-absorbing means consists of a hydraulic pump.

5. The system according to claim 1, wherein said power-absorbing means consists of a hydraulic pump assembly including at least two hydraulic pumps.

6. The system according to claim 4 characterised in that each fan is driven by a hydraulic motor or motors, directly or indirectly by means of a transmission, wherein a first control valve is provided to divert a controlled portion of the pump or pump assembly output flow to the fan motors.

7. The system according to claim 6, characterised in that the first control valve controls flow and/or pressure to the fan motors.

8. The system according to claim 4, characterised in that each fan is driven by a hydraulic motor or motors, directly or indirectly by means of a transmission, wherein a fixed or variable displacement hydraulic pump is provided to divert a controlled portion of the pump or pump assembly output flow to the fan motors.

9. The system according to claim 4, characterised in that each fan is driven by a hydraulic motor or motors, directly or indirectly by means of a transmission, wherein fixed or variable displacement fan motors are arranged to divert a controlled portion of the pump or pump assembly output flow.

10. The system according to claim 7, characterised in that the flow and/or pressure to the each fan motor is individually controllable.

11. The system according to claim 6, characterised in that a first heat exchanger is provided, wherein said first heat exchanger is arranged to subject the portion of the pump or pump assembly output flow delivered to the fan motors to the cooling action of the air stream produced by the fans, or the air for producing the air stream.

12. The system according to claim 6, wherein a second heat exchanger is provided, wherein said second heat exchanger is arranged to cool the portion of the pump or pump assembly output flow delivered to the fan motors using water.

13. The system according to claim 11, characterised in that a hydraulic filter is provided in a cooling conduit.

14. The system according to claim 1, wherein the cooling device consists of a separate stand-alone system.

15. The system according to claim 1, wherein said power-absorbing means consists of a hydraulic pump or pump assembly, and wherein a second control valve is used to control power absorption of the pump or pump assembly.

16. The system according to claim 1, characterised in that the system includes two or more fan arrangements.

17. The system according to claim 1, characterised in that said fan arrangement includes three or more fans, which are substantially axially aligned.

18. The system according to claim 1, wherein said power generating means consists of the engine of a car, and wherein said power absorbing means is connected to a driven output shaft of said car.

19. A method for cooling a braking device and/or a power-generating means in a system for dynamometer testing of motor vehicles, wherein power-absorbing means is used to absorb a power applied thereto by power-generating means, wherein a cooling device includes a fan arrangement for producing an air stream for providing a cooling effect, characterised in that the method includes the step of rotating two fans of said fan arrangement, which are substantially axially aligned, in such a way that the fans rotate in opposite directions relative to each other.

20. The method according to claim 19, wherein said air stream is directed towards the braking device and/or the power-generating means and/or a heat exchanger.

* * * * *